(12) United States Patent
Zhao

(10) Patent No.: US 9,436,332 B2
(45) Date of Patent: Sep. 6, 2016

(54) TOUCH SCREEN AND DRIVING METHOD THEREFOR WITH AN AHEAD TOUCH CONTROL SENSING PERIOD

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/342,202

(22) PCT Filed: May 23, 2013

(86) PCT No.: PCT/CN2013/076174

§ 371 (c)(1),
(2) Date: Feb. 28, 2014

(87) PCT Pub. No.: WO2014/153826

PCT Pub. Date: Oct. 2, 2014

(65) Prior Publication Data

US 2015/0070303 A1 Mar. 12, 2015

(30) Foreign Application Priority Data

Mar. 29, 2013 (CN) .......................... 2013 1 0108944

(51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0412* (2013.01); *G06F 2203/04107* (2013.01)

(58) Field of Classification Search
CPC ............................... G06F 3/044; G06F 3/0412
USPC ....................................... 345/174; 178/18.06
See application file for complete search history.

(56) References Cited

U.S. PATENT DOCUMENTS

| 2008/0180400 A1 | 7/2008 | Kim et al. |
| 2009/0002312 A1 | 1/2009 | Son |

(Continued)

FOREIGN PATENT DOCUMENTS

| CN | 101231563 A | 7/2008 |
| CN | 102439548 A | 5/2012 |

(Continued)

OTHER PUBLICATIONS

International Search Report Issued Dec. 9, 2013; Appln. No. PCT/CN2013/076174.

(Continued)

*Primary Examiner* — Adam J Snyder
(74) *Attorney, Agent, or Firm* — Ladas & Parry LLP

(57) ABSTRACT

The present disclosure discloses a touch screen and a driving method therefore. The touch screen embeds touch control electrodes in a display panel, the touch control electrodes includes touch control signal input electrodes and touch control signal output electrodes which are cross-insulated configured, the first common electrodes are divided into a plurality of areas at least along a direction of the data lines, each area of the first common electrodes corresponds to at least one row of pixel units; the areas of first common electrodes are insulated from each other and used as the touch control signal input electrodes. The touch screen according to the present disclosure divides the common electrodes into a plurality of areas along a direction of the data lines, and uses the areas as touch control signal input electrodes. The present disclosure uses a voltage disturbance generated by common electrodes used as driving electrodes to balance out a reduction of pixel voltage, thereby disturbance impact brought by a scan of the common electrodes is reduced and the quality of the picture is improved.

11 Claims, 4 Drawing Sheets

(56) References Cited

U.S. PATENT DOCUMENTS

| | | | |
|---|---|---|---|
| 2010/0238134 A1* | 9/2010 | Day et al. | 345/174 |
| 2010/0253638 A1* | 10/2010 | Yousefpor et al. | 345/173 |
| 2010/0328259 A1* | 12/2010 | Ishizaki | G06F 3/044 |
| | | | 345/174 |
| 2011/0267293 A1* | 11/2011 | Noguchi et al. | 345/173 |
| 2012/0262389 A1* | 10/2012 | Kida et al. | 345/173 |
| 2013/0033439 A1* | 2/2013 | Kim et al. | 345/173 |
| 2013/0038570 A1 | 2/2013 | Seo et al. | |
| 2013/0057511 A1* | 3/2013 | Shepelev et al. | 345/174 |
| 2014/0111471 A1 | 4/2014 | Zhao | |

FOREIGN PATENT DOCUMENTS

| | | |
|---|---|---|
| CN | 102768604 A | 11/2012 |
| CN | 102914893 A | 2/2013 |
| CN | 203133794 U | 8/2013 |

OTHER PUBLICATIONS

First Chinese Office Action dated May 27, 2015; Appln. No. 201310108944.6.

International Preliminary Report on Patentability Appln. No. PCT/CN2013/076174; Dated Sep. 29, 2015.

Second Chinese Office Action Appln. No. 201310108944.6: Dated Dec. 11, 2015.

Third Chinese Office Action dated Apr. 25, 2016; Appln. No. 201310108944.6.

* cited by examiner

TOUCH SCREEN AND DRIVING METHOD THEREFOR WITH AN AHEAD TOUCH CONTROL SENSING PERIOD

CROSS-REFERENCE TO RELATED APPLICATIONS

This application is a national stage entry of PCT Application No. PCT/CN2013/076174, entitled "TOUCH SCREEN AND DRIVING METHOD THEREFOR" and filed on May 23, 2013, which itself claims priority to a Chinese Patent Application No. 201310108944.6, filed on Mar. 29, 2013, both of which are incorporated by reference in their entireties.

TECHNICAL FIELD

The present disclosure relates to a field of touch screen, and in particularly, to a touch screen and a driving method therefor.

BACKGROUND

A touch panel (TP) as an input media, can be integrated with a display screen to form a touch screen, which plays an important role in the display field.

Wherein, a capacitive touch screen, due to its high sensitivity, has attracted much attention. A mutual capacitive screen, due to its high sensitivity and an advantage of multi-point touch control, has gained much popularity. The capacitive touch screen includes out of cell touch screen and embedded-type touch screen. The embedded-type touch screen is one that integrates a TP into a liquid crystal display panel. Because of the low cost of manufacture, good light transmission and relatively thin module thickness, the embedded-type touch screen is becoming a focus of study.

The basic operation principle of the mutual capacitive touch screen will be briefly described. A coordinate in X-direction of a touch point is determined by a touch driving electrode of a mutual capacitive touch screen, and a coordinate in Y-direction of the touch point is determined by a touch sensing electrode of the touch screen. A touch driving voltage is applied on the side of the touch driving electrodes while a constant voltage is applied on the side of the touch sensing electrodes. To detect the touch points, the touch driving electrodes in X-direction are scanned progressively; when each row of the touch driving electrode is being scanned, signals on all columns of touch sensing electrodes are read; and all intersections of rows and columns can be scanned by one circle of scanning. This way of touch control location detection may particularly determine coordinates of multiple points and thus achieve multi-point touch.

In the development of nowadays embedded-type touch screen technology, a growing trend is to multiplex the existing lines of a liquid-crystal display panel as touch sensors, and implement display and touch functions by a time division driving. That is to say, during a display stage, each signal charges and discharges according to an original liquid-crystal display panel driving manner; and during a touch stage, all pixel TFTs are turned off, a voltage across two ends of the liquid-crystal remains constant, and the multiplexed lines perform touching-related operations.

A current touch screen uses a common electrode (Vcom) as the touch driving electrode, Vcom performs a high-frequency-pulse-scan as a touch scan line while pixels remain in a liquid-crystal state. In this way, because of coupling, a pixel voltage varies following variation of the voltage of Vcom, and the magnitudes of the variations of the pixel and Vcom are different due to the presence of a pixel capacitance. When this is reflected to an effective (RMS) voltage, it shows that a difference between the effective values of the pixel voltage and Vcom is smaller than that in the non-scanning state of Vcom.

As shown in FIGS. 1 and 2, timing diagrams of a touch screen driving method in the prior art are demonstrated. In the prior art, the touch operation is performed after all data are displayed. The touch operation may cause a disturbance of voltage, and the magnitudes of the variations of the pixel electrode and Vcom are inconsistent due to the presence of the pixel capacitance, such that quality of the picture is affected. Each data frame may be divided into a display period and a touch period. At the display period, pixel electrodes are charged, the common electrodes remain at a DC/AC voltage, and a voltage difference between the pixel electrode and the common electrode remains constant due to the presence of the storage capacitance. At the touch period, the common electrode, as the touch driving electrode, performs a high-frequency scan with different frequency and voltage from those during the display period, and because of the presence of the storage capacitance, the voltage difference between the pixel electrode and the common electrode during the touch period can not be consistent with the previous voltage difference, which will result in flickers in the picture. In addition, as the touch and scan are put together, the driving of the touch screen is susceptible to the disturbance of the external noise.

SUMMARY

This disclosure is proposed in order to solve a problem of the existing touch screen that an effective voltage difference across two ends of the liquid crystal varies during a touch period, and affects the quality of the picture.

According to one aspect of the present disclosure, a touch screen is provided, wherein touch control electrodes are embedded in a display panel. The touch control electrodes comprise touch control signal input electrodes and touch control signal output electrodes which are cross-insulated configured. The display panel comprises data lines, gate lines and first common electrodes, the gate lines and data lines define a plurality of pixel units, and each pixel unit has a pixel electrode provided therein.

The first common electrodes are divided into a plurality of areas at least along a direction of the data lines, each area of the first common electrodes corresponds to at least one row of pixel units; the areas of the first common electrodes are insulated from each other and used as the touch control signal input electrodes.

According to another aspect of the present disclosure, a driving method for a touch screen is provided, the driving method comprising: applying a pixel signal onto pixel electrodes of the pixels corresponding to respective area of the first common electrodes progressively; for each area of the first common electrodes, upon pixel electrodes in a last row of pixels corresponding to said area are applied with the pixel signal, applying a touch control detection drive signal onto said area of first common electrodes during an impulse response period, and detecting voltages or currents of the touch control signal output electrodes.

The touch screen of the present disclosure divides common electrodes into a plurality of areas along a direction of the data line, to be used as the touch control signal input electrodes. The present disclosure applies a touch control detection drive signal during an impulse response period which is after the common electrodes are applied with a display driving signal for displaying, and uses a voltage disturbance generated by the common electrodes used as the driving electrodes to balance out a reduction of the pixel voltage. Therefore disturbance impact brought by a scan of the common electrodes is reduced, the effective voltage difference across two ends of the liquid-crystal is lowered down, and the quality of the picture is improved.

DETAILED DESCRIPTION

In order to make the technical problem to be solved by the present disclosure, the technical solution and advantages of the present disclosure more clear, detailed descriptions will be given in conjunction with the accompanying drawings and specific embodiments.

Figure 1:
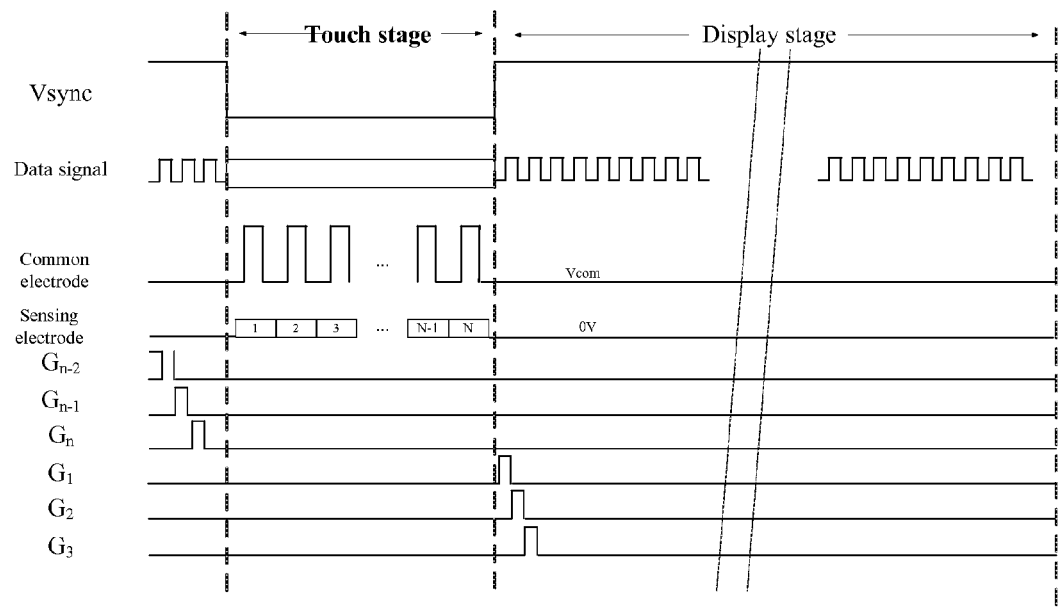
FIG. 1 is a timing sequence diagram of a driving method employed by a touch screen in the prior art.
Figure 2:
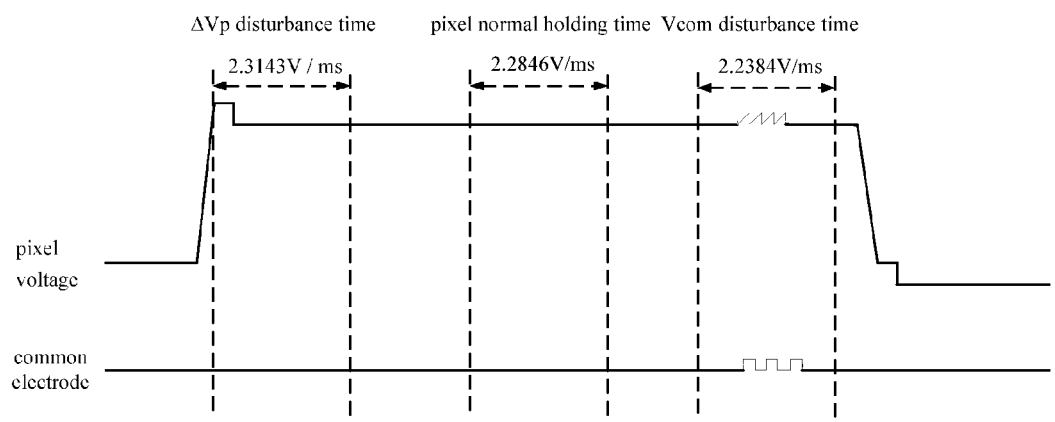
FIG. 2 is a diagram illustrating the relationship between a pixel voltage and a common voltage of the driving method employed by a touch screen in the prior art.
Figure 3:
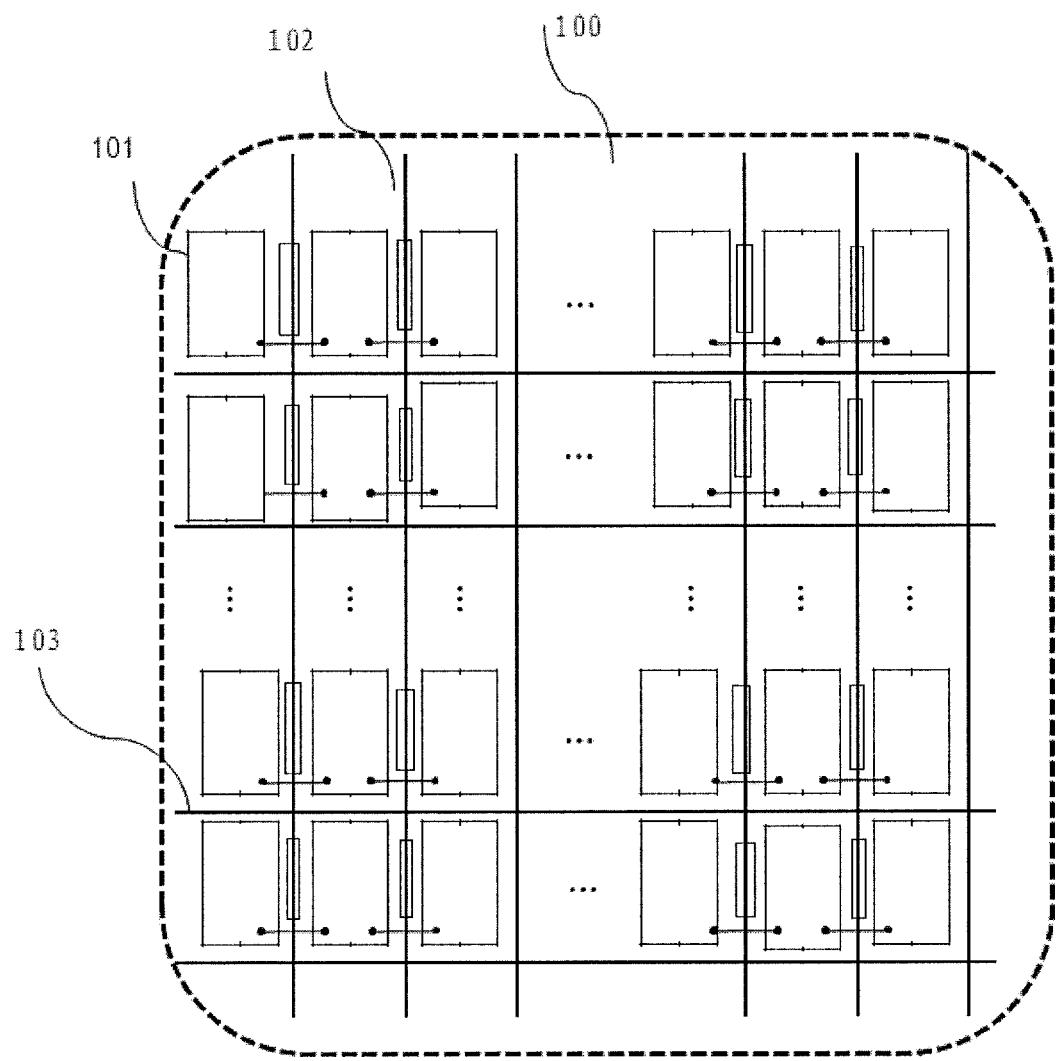
FIG. 3 is a structural schematic diagram of a touch screen according to an embodiment of the present disclosure.

As shown in FIG. 3, a structural schematic diagram of a touch screen according to an embodiment of the present disclosure is illustrated. The touch screen is configured so that touch control electrodes are embedded in a display panel 100. The touch control electrodes comprise touch control signal input electrodes and touch control signal output electrodes which are cross-insulated configured. The display panel 100 comprises data lines 102, gate lines 103 and first common electrodes 101. The gate lines 103 and data lines 102 define a plurality of pixel units, each pixel unit is configured to comprise a pixel electrode therein. The first common electrodes 101 are divided into a plurality of areas at least along a direction of the data lines, and each area of the first common electrodes corresponds to at least one row of pixel units. The areas of the first common electrodes are insulated from each other and used as the touch control signal input electrodes.

The touch screen of the present disclosure divides common electrodes into a plurality of areas along a direction of the data line, to be used as the touch control signal input electrodes. The present disclosure applies a touch control detection drive signal after the common electrodes are applied with a display driving signal for displaying, and uses a voltage disturbance generated by the common electrodes used as the driving electrodes to balance out a reduction of the pixel voltage. Therefore disturbance impact brought by a scan of the common electrodes is reduced, the effective voltage difference across two ends of the liquid-crystal is lowered down, and the quality of the picture is improved.

The touch screen of the present disclosure multiplexes the first common electrodes of the display panel as the touch control signal input electrodes, and divides the first common electrodes into a plurality of areas along a direction of the data line, with each area of the first common electrodes corresponding to one row or several rows of pixel electrodes, whereby area-division arrangement of the common electrodes is implemented. In an example that each area of the first common electrodes corresponds to sixty rows of pixel electrodes, the common electrodes should be divided into a plurality of areas with each area corresponding to sixty rows of pixel electrodes.

The touch control signal output electrodes of the present disclosure may be formed by data lines or second common electrode lines parallel to the data lines. When data lines are used to form touch control signal output electrodes, a plurality of data lines may be chosen for combination, to improve the touch sensitivity. The touch screen of the present disclosure further comprises common electrode leads, for leading respective areas of the first common electrodes to a common voltage supply circuit.

Figure 4:
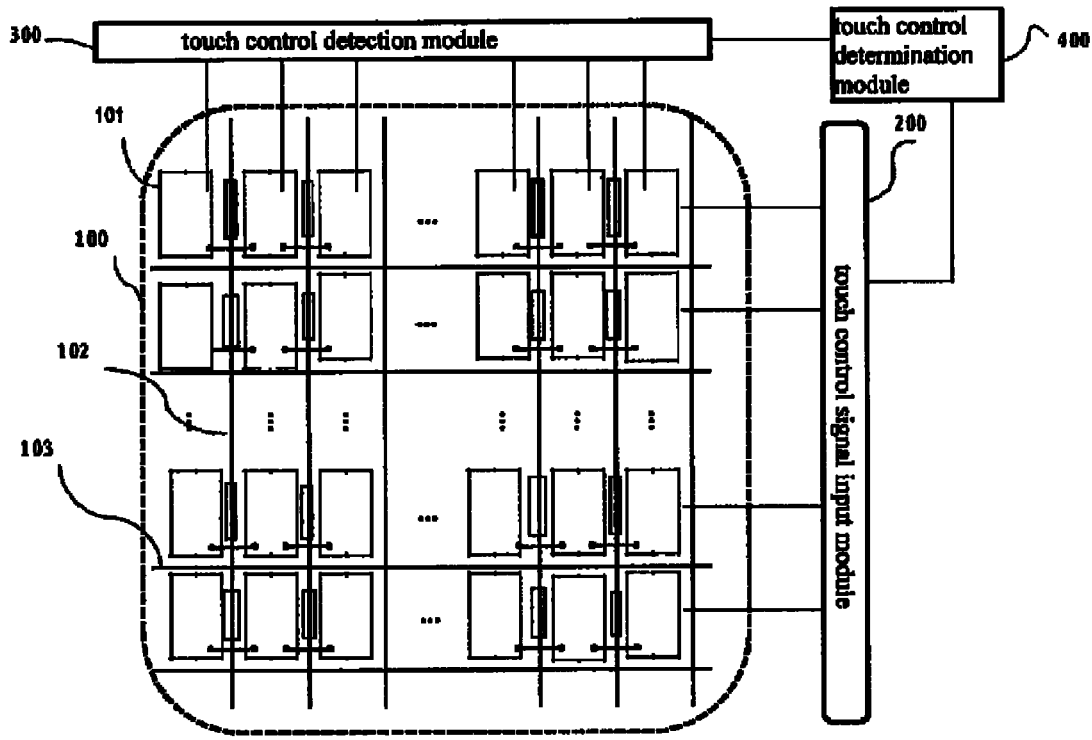
FIG. 4 is a structural schematic diagram of a touch screen according to a second embodiment of the present disclosure.

As shown in FIG. 4, a structural schematic diagram of a touch screen according to a second embodiment of the present disclosure is illustrated. The touch screen is further configured to comprise a touch control signal input module 200, for applying a touch control detection signal to the touch control signal input electrodes in a progressive manner; a touch control signal detection module 300, for detecting voltages or currents of the touch control signal output electrodes; and a touch control determination module 400, for determining touch position(s) according to variations of mutual capacitances formed by the touch control signal input electrodes and the touch control signal output electrodes. The touch control determination module determines the touch position in the following way: first, a voltage or current value between the touch control signal input electrode and the touch control signal output electrode is measured, and then a position of the touch point on the electrode line is determined based on the correspondence between a pre-recorded value and a coordinate value, and thus an exact position of the touch point on a certain electrode line may be obtained.

The touch screen according to the present disclosure further comprises a gate driver configure to drive the gate lines; and a synchronizing circuit configured to, after one area of first common electrodes is scanned by the gate driver, cause the touch control signal input module to apply the touch control detection drive signal onto the area of the first common electrodes during an impulse response period. Said impulse respond period may be a very short time, such as 0-2 ms, and preferably less than 1 ms. Because human eyes have a time-delay effect, only color changes over 1 ms may be distinguished. So in the case that the time is short enough, the effective voltage difference across two ends of the liquid-crystal may be reduced instantaneously, and such that the quality of the picture may be improved.

Figure 5:
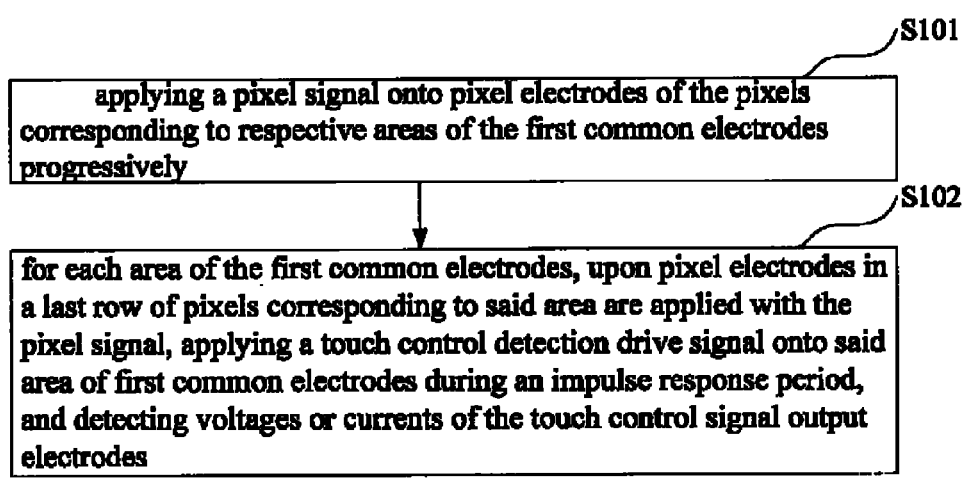
FIG. 5 is a flow chart of a driving method for a touch screen according to an embodiment of the present disclosure.

As shown in FIG. 5, a flow chart of a driving method for a touch screen according to an embodiment of the present disclosure, the method comprising:

Step S101, applying a pixel signal onto pixel electrodes of the pixels corresponding to respective areas of the first common electrodes in a progressive manner;

Step S102, for each area of the first common electrodes, upon pixel electrodes in a last row of pixels corresponding to said area are applied with the pixel signal, applying a touch control detection drive signal onto said area of first common electrodes during an impulse response period, and detecting voltages or currents of the touch control signal output electrodes.

The driving method of the touch screen according to the present disclosure applies a touch control detection drive signal during an impulse response period which is after the common electrodes are applied with a display driving signal for displaying, changes the driving sequence by means of a cross-time-division method, uses a voltage disturbance generated by the common electrodes used as the driving electrodes to balance out a reduction of the pixel voltage. Therefore disturbance impact brought by a scan of the common electrodes is reduced, the effective voltage difference across two ends of the liquid-crystal is lowered down, and the quality of the picture is improved.

According to the driving method of the touch screen of the present disclosure, for each area of the first common electrodes, an application of the touch control detection drive signal is completed within an impulse response period which is after the pixel signal has been applied onto the pixel electrodes in the last row of pixels corresponding to said area of the first common electrode. The impulse response period may be 0-2 ms, preferably may be 0-1 ms.

The driving method of the touch screen of the present disclosure further comprises: determining touch position(s) according to variations of mutual capacitances formed by touch control signal input electrodes and touch control signal output electrodes.

Figure 6:
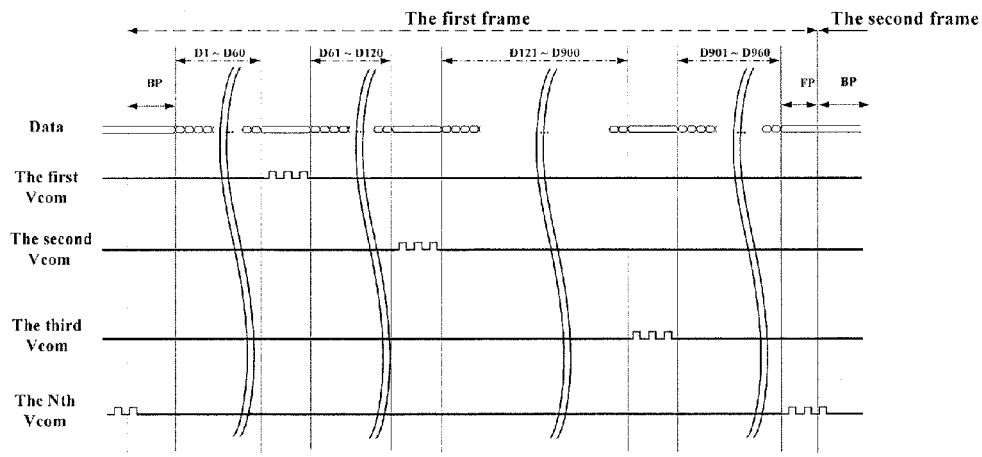
FIG. 6 is a timing sequence diagram of the driving method of FIG. 5.

As shown in FIG. 6, a timing sequence diagram of the driving method of the touch screen according to the present disclosure is illustrated. The embodiment takes 960 rows of pixels as an example, wherein every 60 rows of pixel electrodes correspond to one Vcom electrode; a Vcom electrode, as a multiplexing electrode, forms one electrode of a touch sensor, and another electrode may be formed by the data line or Vcom line, or other lines such as a second common electrode line parallel to the data line.

As shown in FIG. 6, when charging of 60 rows of pixels corresponding to the first row of Vcom is completed, the first row of Vcom switches to a touch mode to perform touch driving immediately, so that after the effective voltage variation caused by the touch scan is balanced out with Δ vp, the effective voltage variation across the two ends of the first row of liquid-crystal is reduced (compared to the effective voltage variation brought by Δ vp), and degradation of picture quality and flicker phenomenon are improved. Due to the impact of the storage capacitance, when the scan of a row of pixels is completed, the gate voltage of the Thin Film Transistor of each pixel reduces and the voltage of the pixel electrode reduces by a certain value accordingly. The reduced value is Δ vp, also called an impulse voltage, which will cause impact on the display, particularly in the way that during a certain time period, human eye may sense the change of brightness and color. Said time period in the present application is also called the impulse response period, and said time period is slightly larger than a response time of the time-delay effect of human eye when the voltage drops quickly. Other lines of Vcom perform the scan in the same manner, so that a Vcom disturbance impact brought by the Vcom electrode scan is reduced.

The driving method according to the present disclosure may improve the picture quality for the reasons below. First, the relevant principles as follows should be understood:

1. Vcom, as a touch scanning line, performs a high-frequency pulse scan while pixels remain in a liquid-crystal state. In this way, a pixel voltage may vary following the variation of the voltage of Vcom due to coupling, and the magnitudes of the variations of the pixel voltage and Vcom are different due to the presence of a pixel capacitance. When this is reflected to an effective (RMS) voltage, it shows that a difference between the effective voltage values of the pixel voltage and Vcom is smaller than that in the non-scanning state of Vcom.

2. A liquid-crystal deflection is decided by the effective voltage across the two ends of the liquid-crystal.

3. Human eyes have a time-delay effect, and it is assumed that a color change over 1 ms can be distinguished (in practice, it may be within 1-2 ms).

According to the above three features, a relative simulation (with Vcom scan frequency being 150 k) is performed without considering 1 off (turn off). The effective voltage difference (2.3143V) related to Δ VP caused within 1 ms is 30 mV larger than the RMS difference (2.2846V) in the case of holding the state; and the effective voltage difference (2.2384V) related to the Vcom scan caused within 1 ms is 50 mV smaller than the RMS difference (2.2846V) in the case of holding the state. Thus it may be seen that the relative value of the flicker produced by the Vcom disturbance is larger than the relative value of the flicker produced by Δ Vp.

Figure 7:
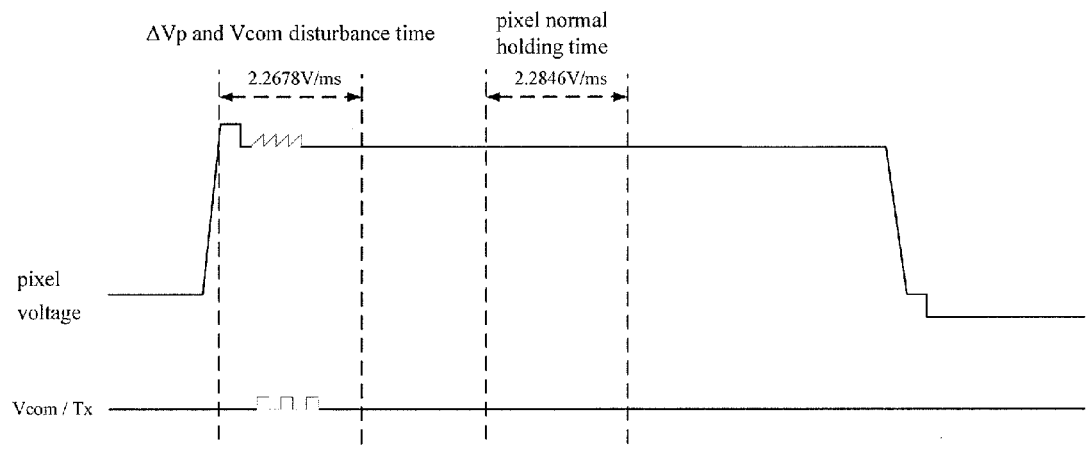
FIG. 7 is a simulation diagram generated as the result of using the driving method according to an embodiment of the present disclosure.

FIG. 7 is a simulation diagram generated as the result of using the driving method according to the present disclosure, wherein distribution of a difference between the pixel effective voltage and the Vcom effective voltage in a timing sequence state is illustrated. Since the effective voltage difference related to Δ Vp becomes larger while the effective voltage difference related to Vcom disturbance becomes smaller, the overall effective voltage difference is balanced out when Δ Vp and Vcom disturbances happen sequentially. The effective voltage difference (2.2678V) related to Δ Vp and Vcom disturbance is about 20 mV smaller than the effective voltage difference (2.2846V) at a normal holding state. As seen from the simulation result, this driving method not only removes the Vcom disturbance produced during the Vcom scanning, but also reduces the flicker produced by Δ Vp. In other words, the present disclosure brings a touch control sensing period in which the flicker is produced in an embedded-type touch screen forward to a period in which voltages of respective pixel electrodes are reduced when the scan is completed, and because of the time-delay effect of human eyes, the flicker is prevented from appearing when the pixels are stably displayed, and thus the impact caused by the flicker is reduced.

To summarize, the touch screen according to the present disclosure divides the common electrodes into a plurality of areas along a direction of the data lines, and the areas are used as touch control signal input electrodes. The present disclosure immediately applies a touch control detection drive signal after a display driving signal is applied to the common electrode for displaying, uses a voltage disturbance generated by the common electrodes used as driving electrodes to balance out a reduction of the pixel voltage. Therefore disturbance impact brought by a scan of the common electrodes is reduced, the effective voltage difference across two ends of the liquid-crystal is lowered down, and the quality of the picture is improved.

Above are only preferred embodiments of the present disclosure, and it should be understood by an ordinary person skilled in the art that improvements and variations can be conceived without departing from the principles described within the present disclosure, such improvements and variations may also be taken as within the scope of the present disclosure.

What is claimed is:

1. A touch screen with touch control electrodes embedded in a display panel, the touch control electrodes comprising touch control signal input electrodes and touch control signal output electrodes which are cross-insulated configured, the display panel comprising data lines, gate lines and first common electrodes, the gate lines and data lines defining a plurality of pixel units, each pixel unit having a pixel electrode provided therein, wherein, the first common electrodes are divided into a plurality of areas at least along a direction of the data lines; each area of the first common electrodes corresponds to at least one row of pixel units; the areas of first common electrodes are insulated from each other and used as the touch control signal input electrodes, wherein the touch screen further comprises:
a touch control signal input module, configured to apply a touch control detection drive signal onto the touch control signal input electrodes progressively;
a touch control signal detection module, configured to detect voltages or currents of the touch control signal output electrodes;
a touch control determination module, configured to determine touch position(s) according to variations of mutual capacitances formed by the touch control signal input electrodes and the touch control signal output electrodes;
a gate driver configured to drive the gate lines; and
a synchronizing circuit configured to, after one area of first common electrodes is scanned by the gate driver, cause the touch control signal input module to apply the touch control detection drive signal onto the area of the first common electrodes during an impulse response period, to use a voltage disturbance generated thereby on the pixel electrodes of the respective pixels in the area to balance out a reduction of the voltage on the pixel electrodes during the impulse response period, which is a period after the scan of the area of the first common electrodes is completed and during which a voltage of pixel electrodes of the pixels in the area of the first common electrodes reduces by a certain value.

2. The touch screen according to claim 1, wherein the touch control signal output electrodes are formed by the data lines or second common electrode lines parallel to the data lines.

3. The touch screen according to claim 2, wherein the touch screen further comprises common electrode leads, configured to lead every areas of the first common electrodes to a common voltage supply circuit.

4. The touch screen according to claim 1, wherein the touch screen further comprises common electrode leads, configured to lead respective areas of the first common electrodes to a common voltage supply circuit.

5. The touch screen according to claim 1, wherein the impulse response period is 0-2 ms.

6. A driving method for a touch screen with touch control electrodes embedded in a display panel, the touch control electrodes comprising touch control signal input electrodes and touch control signal output electrodes which are cross-insulated configured, the display panel comprising data lines, gate lines and first common electrodes, the gate lines and data lines defining a plurality of pixel units, each pixel unit having a pixel electrode provided therein, the first common electrodes being divided into a plurality of areas at least along a direction of the data lines; each area of the first common electrodes corresponding to at least one row of pixel units; the areas of first common electrodes being insulated from each other and used as the touch control signal input electrodes; the driving method comprising:

applying a pixel signal onto pixel electrodes of the pixels corresponding to respective areas of the first common electrodes progressively;

for each area of the first common electrodes, upon pixel electrodes in a last row of pixels corresponding to said area are applied with the pixel signal, applying a touch control detection drive signal onto said area of first common electrodes during an impulse response period to use a voltage disturbance generated thereby on the pixel electrodes of the respective pixels in the area to balance out a reduction of the voltage on the pixel electrodes during the impulse response period, and detecting voltages or currents of the touch control signal output electrodes, said impulse response period is a period after the pixel electrodes are applied with the pixel signal and during which a voltage of the pixel electrodes of the pixels in the area of the first common electrodes reduces by a certain value.

7. The driving method for a touch screen according to claim 6, wherein, for each area of the first common electrodes, an application of the touch control detection drive signal is completed 0-2 ms after the pixel signal has been applied onto the pixel electrodes in the last row of pixels corresponding to said area of the first common electrode.

8. The driving method for a touch screen according to claim 7, wherein, for each area of the first common electrodes, an application of the touch control detection drive signal is completed 1 ms after the pixel signal has been applied onto the pixel electrodes in the last row of pixels corresponding to said area of the first common electrode.

9. The driving method for a touch screen according to claim 8, further comprising: determining touch position(s) according to variations of mutual capacitances formed by the touch control signal input electrodes and the touch control signal output electrodes.

10. The driving method for a touch screen according to claim 7, further comprising: determining touch position(s) according to variations of mutual capacitances formed by the touch control signal input electrodes and the touch control signal output electrodes.

11. The driving method for a touch screen according to claim 6, further comprising: determining touch position(s) according to variations of mutual capacitances formed by the touch control signal input electrodes and the touch control signal output electrodes.

* * * * *